Patented Mar. 30, 1926.

1,578,523

UNITED STATES PATENT OFFICE.

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO.

INSECTICIDE-FUNGICIDE AND PROCESS FOR MAKING THE SAME.

No Drawing.     Application filed January 12, 1925. Serial No. 1,738.

*To all whom it may concern:*

Be it known that I, EDWARD C. HOLTON, a citizen of the United States, and a resident of Olmsted Falls, county of Cuyahoga, State of Ohio, have invented certain new and useful Improvements in Insecticide-Fungicide and Processes for Making the Same, of which the following is a specification.

This invention relates to an improved form of insecticide and fungicide and process for making same.

The consumption of insecticides today is vastly greater than it was a few years ago, yet it hardly keeps pace with the increase in insect infestation. Heretofore arsenic has been one of the principal substances used as an insecticide and the demand for this material has become so great that there is a possibility that the world's supply will become inadequate to cope with the situation.

Comparable to the losses caused by insects are those caused by fungi and it has become quite general practice to mix various insecticides and fungicides in an attempt to check both of these evils in one application. Sometimes the mixtures which have been heretofore used have given good results and at other times undesirable reactions have taken place which cause burning of the foliage and fruit, and even the loss of the insecticide before it has accomplished its mission. It is an object of this invention to produce a combined insecticide-fungicide which not only possesses great efficiency in itself, but may be mixed in any desired proportions, with the arsenical insecticides without any disastrous results. It is also an object of the invention to provide an effective substitute for arsenic, for these purposes, that will relieve the strain on that most useful commodity.

It has long been known that the salts of barium possess a considerable degree of toxicity, and barium carbonate and barium chloride have been used to a considerable extent for poisoning insects and vermin. Owing to the extreme solubility of barium chloride it is unsatisfactory for general use as an insecticide, because it is usually injurious to the vegetation to which it is applied, and it is also easily washed off by rains.

The fluorides of the different elements, generally, are toxic but the fluorides of the alkalies, on account of their ready solubility in water, have not been heretofore used as insecticides and fungicides, although they are largely used as antiseptics. The fluorides of the elements of the alkaline earths group are insoluble or but slightly soluble in water, and I have found that they are well adapted for use as insecticides and fungicides, and of these the barium compound is generally to be preferred, for in this salt the toxicity is developed to the highest degree, probably due to the fact that both of its components are strongly toxic.

Sulfur has long been used as a fungicide, and experience has shown that the best results are attained by the use of sulfur in a state of extreme division. Sulfur may be brought into this state by mechanical means or by chemical processes or by a combination of the two. Heretofore, it has been customary to prepare finely divided, chemically precipitated sulfur by the reaction of hydrochloric or sulfuric acids on alkaline polysulfids. Also, solutions of hydrogen sulfid and sulfur dioxide, may be caused to react or a reaction may take place in the gaseous phase. These reactions have been well known and utilized in various industries for many years. Sulfur, prepared by such methods, is rather expensive for the reason that the salts, such as sodium chloride or sodium sulfate, simultaneously formed, are so diluted that they are worthless and must be removed by extensive washing, which is rather costly.

If sulfur, which has been prepared in the manner described, is to be used as a fungicide, it is best preserved in a wet state, for after it has once been dried, it is a difficult and expensive matter to convert it into a dry powder form which will possess the property of being readily wettable with water. It is one of the objects of this invention to provide an insecticide-fungicide containing the toxic elements barium fluoride and sulfur in such form that they may be readily and conveniently packed for transportation and will be preserved in a condition in which they may be used with the maximum degree of efficiency. In my earlier application, No. 697,712, filed March 8, 1924, I have described a method of producing a coprecipitate of sulfur and barium fluoride which will meet the conditions set forth, but my present invention has for one of its objects the production of a compound that will meet these conditions and have a relatively higher fluorine content and a relatively lower specific gravity, so as to have better suspension qualities when mixed with water.

My preferred method of practicing my invention is to first prepare a "black ash", such as is used in the lithopone industry, and then lixiviate this with water in the usual manner to produce what is commercially known as "barium liquor". This is then heated with sulfur in quantity sufficient to form a polysulfid of the composition represented by the symbol BaS$_x$ in which $x$ is greater than one and may vary from one to five. This reaction may be expressed thus:

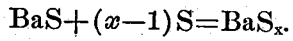
$$BaS + (x-1)S = BaS_x.$$

The solution of polysulfid, thus produced, is clarified by filtering and conveyed to a suitable reaction tower or vessel and hydrosilicofluoric acid, diluted with water, is gradually added thereto with proper agitation. In practice, the dilute solution of the hydrosilicofluoric acid will usually be varied to suit the conditions and the acid content of the solution may run between three and twenty-five percent. By this reaction there is produced a coprecipitate of finely divided sulfur and barium silicofluoride and, since the barium silicofluoride is practically insoluble in water, there is only a very slight loss of either barium or fluorine. A portion of the sulfur, in the barium polysulfid, passes off as hydrogen sulfid and by agitating this gas with more of the barium polysulfid, and gaseous sulfur dioxide, or an aqueous solution of sulfid dioxide, in a closed apparatus provided with an agitator, or by allowing them to flow together or in counter currents in a reaction tower, or by any of the usual methods of effecting such reactions, the total sulfur in the compounds used may be obtained in a form suitable for use as a fungicide in combination with insecticidal and fungicidal barium silicofluoride.

The sulfur dioxide used to recover the sulfur in the hydrogen sulfid may be prepared directly from burning sulfur, or may be drawn from cylinders of the commercial liquid sulfur dioxide.

By maintaining the proper proportions, practically all of the barium in the barium polysulfid solution used, and practically all of the fluorine in the hydrosilicofluoric acid used, are recovered as barium silicofluoride; and practically all of the sulfur from the barium polysulfid together with all of the sulfur in the sulfur dioxide, is recovered as fungicidal sulfur in intimate mixture with the barium silicofluoride, the major portion of the mixture being barium silicofluoride and the minor portion being sulfur.

One specific method of practicing my invention is as follows: About 3,200 pounds of barytes ore is crushed to an average size of one-sixth inch, or smaller, and with this is mixed 800 pounds of crushed coke. The mixing is done in a concrete mixer or similar apparatus and requires about five minutes. The mixture is then dumped into a revolving furnace and heated, by direct flame and hot flue gases passing therethrough, for about three hours. The black ash thus produced is charged into a leaching tank and the soluble compounds, consisting mostly of barium sulfide are leached out with water, forming a solution of about 18° Bé. at 50° C. This solution contains approximately 11% of barium and 2.5% sulfur, or approximately 1.3 pounds of barium per gallon and approximately 0.3 pounds of sulfur per gallon.

The barium polysulfide solution is now prepared by adding approximately nine-tenths of a pound of sulfur to each gallon of the aforesaid 18% liquor and the mixture is kept agitated at a temperature of 100° C., or below, until all of the sulfur has dissolved. This polysulfide liquor is now allowed to cool and diluted with two parts of water to one of liquor, although the amount of dilution may be varied within relatively wide limits. Ice may be used, with the water, if convenient, for the purpose of expediting the cooling. To the diluted liquor there is now added, in a reaction vessel or reaction tower, a dilute solution of hydrosilicofluoric acid in the proportion of about 27 pounds of 5% acid to each gallon of the aforesaid 18% liquor. To avoid the loss of hydrogen sulfide, and to increase the sulfur content, approximately 0.3 pounds of sulfur dioxide are used for each gallon of the 18% liquor. The resulting co-precipitate is filtered and the press cakes are dried and finely pulverized and may be used in dry dusting operations or may be mixed with water and used in liquid sprays, alone or in combination with other insecticides and fungicides. If desired, the drying operation may be omitted and the co-precipitate may be preserved as a moist paste.

When barium silicofluoride is coprecipitated with sulfur, in the manner described, there is a tendency for the barium silicofluoride to assume a crypto-crystalline or amorphous form, rather than the definite crystalline form usually assumed when coming out of solution in water. This tendency may be still further augmented by adding to the liquors, before precipitation, a very small quantity of some substance such as glue or casein or gum acacia, or sulfonated castor oil or some other substance, such as is ordinarily used as a protective to prevent crystallization. Care must be exercised, however, to use the minimum quantity required, to produce the desired effect, since anything more than this amount tends to make the subsequent filtration extremely difficult. It is not possible to state in advance the exact amount of the protective substance to be used, in each instance, since this varies somewhat with the nature of the substance and the composition and concentration of the solution under treatment. However, anyone practicing this invention, readily learns under what conditions and to what extent the protective substance should be used to give a precipitate approximately amorphous, and yet readily filterable.

In practicing this invention, if it should be found that the filtration is rendered too slow or too difficult, the use of the protective substance, before filtration, may be dispensed with and some of the beneficial results sought, may be obtained by dusting the protective, in a dry powder form, over the wet filter cake, or a solution or suspension of the protective substance may be sprinkled over the wet filter cake.

The coprecipitate of barium silicofluoride and sulfur, produced in accordance with my invention, is a highly useful material for use as an insecticide and fungicide and the sulfur in the mixture is maintained in its most active condition and is at all times readily wettable with water so that the material may be used as a wet spray or in dry form for dusting purposes. The barium silicofluoride, being in a substantially amorphous condition, as above described, is also in the most active form for the purpose referred to and constitutes, as above stated, the major portion of the mixture, the minor portion of which is sulfur, with a small percentage, usually less than two percent, of the protective substance. There will also be traces of other compounds of the elements of the alkaline earths group, but these do not affect the efficiency of the mixture.

Having thus described my invention, what I claim is:

1. In methods for the production of a product for the purposes specified, the step which consists in reacting upon a polysulfid of barium with hydrosilicofluoric acid for producing a coprecipitate of finely divided sulfur and barium silicofluoride.

2. In methods for the production of a product for the purposes specified, the step which consists in reacting upon an aqueous solution of a polysulfid of barium with hydrosilicofluoric acid, using a protective substance to prevent crystallization, and thereby producing a coprecipitate of finely divided sulfur and substantially amorphous barium silicofluoride.

3. In methods for the production of a product for the purposes specified, the steps which consist in boiling a barium sulfid liquor with sulfur to form a barium polysulfid liquor, and then reacting upon the polysulfid with hydrosilicofluoric acid for producing a coprecipitate of finely divided sulfur and barium silicofluoride.

4. In methods for the production of a product for the purpose specified, the steps which consist in boiling a barium sulfid liquor with sulfur to form a barium polysulfid liquor, clarifying the polysulfid liquor, and reacting upon the clarified liquor with hydrosilicofluoric acid and sulfur dioxide for producing a coprecipitate of finely divided sulfur and barium silicofluoride.

5. In methods for the production of a product for the purposes specified, the steps which consist in boiling a barium sulfid liquor with sulfur to form a barium polysulfid liquor, then reacting upon the polysulfid liquor with hydrosilicofluoric acid, and then mingling the gases evolved in said reaction with sulfur dioxide and more of the polysulfid liquor and thereby producing a coprecipitate of finely divided sulfur and barium silicofluoride.

6. As a new product or article of manufacture, a mixture of finely divided sulfur and barium silicofluoride in substantially amorphous form.

7. As a new product or article of manufacture for insecticidal and fungicidal purposes, a dry powdered mixture of which the major portion is barium silicofluoride in substantially amorphous form and the minor portion is finely divided sulfur.

In testimony whereof I affix my signature.

EDWARD C. HOLTON.